Feb. 26, 1957 E. S. SMITH 2,782,814
MACHINE FOR FORMING LONGITUDINALLY CURVED MEMBERS
Filed March 26, 1954 3 Sheets-Sheet 1

Egmont S. Smith
INVENTOR.

BY
ATTORNEYS

Egmont S. Smith
INVENTOR.

BY
Browning Simmons & Hyer
ATTORNEYS 2,782,814
Patented Feb. 26, 1957

2,782,814

MACHINE FOR FORMING LONGITUDINALLY CURVED MEMBERS

Egmont S. Smith, Houston, Tex., assignor to B & B Engineering & Supply Company, Inc., Houston, Tex., a corporation of Texas Application March 26, 1954, Serial No. 418,905

13 Claims. (Cl. 143—85)

This invention relates to machines for forming longitudinally curved members and more particularly to machines for forming longitudinally curved, concavo-convex members such as sections of insulation for pipe L's and the like.

In the manufacture of insulating materials, such as polymerized styrene which has been expanded into a solid foam like structure, cork or other materials which cannot readily be molded as an insulating covering for pipes, conduits, and the like, it is desirable to form the material in blocks and then to shape the blocks of material into segments which are fastened together about the pipe as by cementing.

While satisfactory means have been developed for sawing straight segments of insulation, the practice in forming insulating material for tube turns or pipe L's has been to glue together a number of small pieces of insulation in a manner to form a generally curved segment of insulation which would fit about a tube turn or L. This method of forming L's is, of course, time consuming and expensive, and it would be desirable to have a machine capable of quickly and efficiently forming curved segments of insulating material for L's or the like.

It is an object of this invention to provide a machine for quickly and easily sawing curved segments from a block of material, which machine may be used for cutting insulating material.

Another object is to provide a simple, efficient machine for forming longitudinally curved, concavo-convex members.

Another object is to provide a simple, efficient machine for forming longitudinally curved, concavo-convex members in which the work piece need not be positioned in the machine with precision, yet which will fashion the curved members to close tolerance.

Another object is to provide a machine for forming longitudinally curved, concavo-convex members in which the concavo-convex surfaces are formed simultaneously.

Another object is to provide a machine for forming longitudinally curved, concavo-convex members in which the wall thickness of the members may be varied.

Another object is to provide a machine for forming longitudinally curved, concavo-convex members in which the radius of curvature of the members may be varied.

Another object is to provide a machine for forming longitudinally curved members which do not require the use of guide surfaces, slideways or the like for feeding material through the machine, which surfaces or the like when worn affect the tolerance of the cuts made by the machine.

Another object is to provide a means for mounting a belt driven annular saw wherein the means maintaining the saw in the desired plane of rotation bears directly upon the drive belt eliminating the necessity of special thust bearings running against the backside of the blade or in a groove in the outer periphery of the blade.

Other objects, advantages and features of this invention will appear from a perusal of the specification, the appended claims, and the attached drawings.

In the drawings wherein there is shown by way of illustration a machine embodying this invention and wherein like reference numerals indicate like parts:

Figure 1:
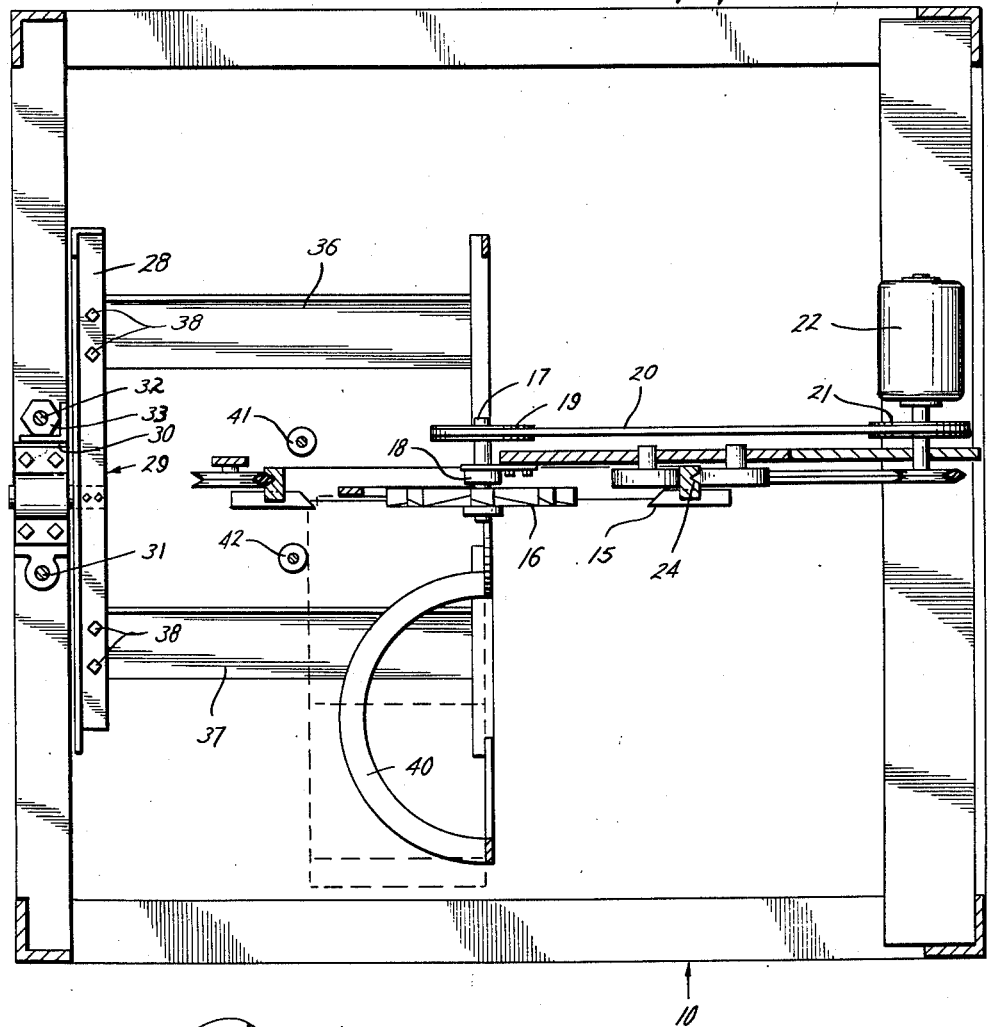
Fig. 1 is a sectional plan view of an insulation cutting machine constructed in accordance with this invention, showing a work piece in dashed outline in a position to be moved through the saws.
Figure 3:
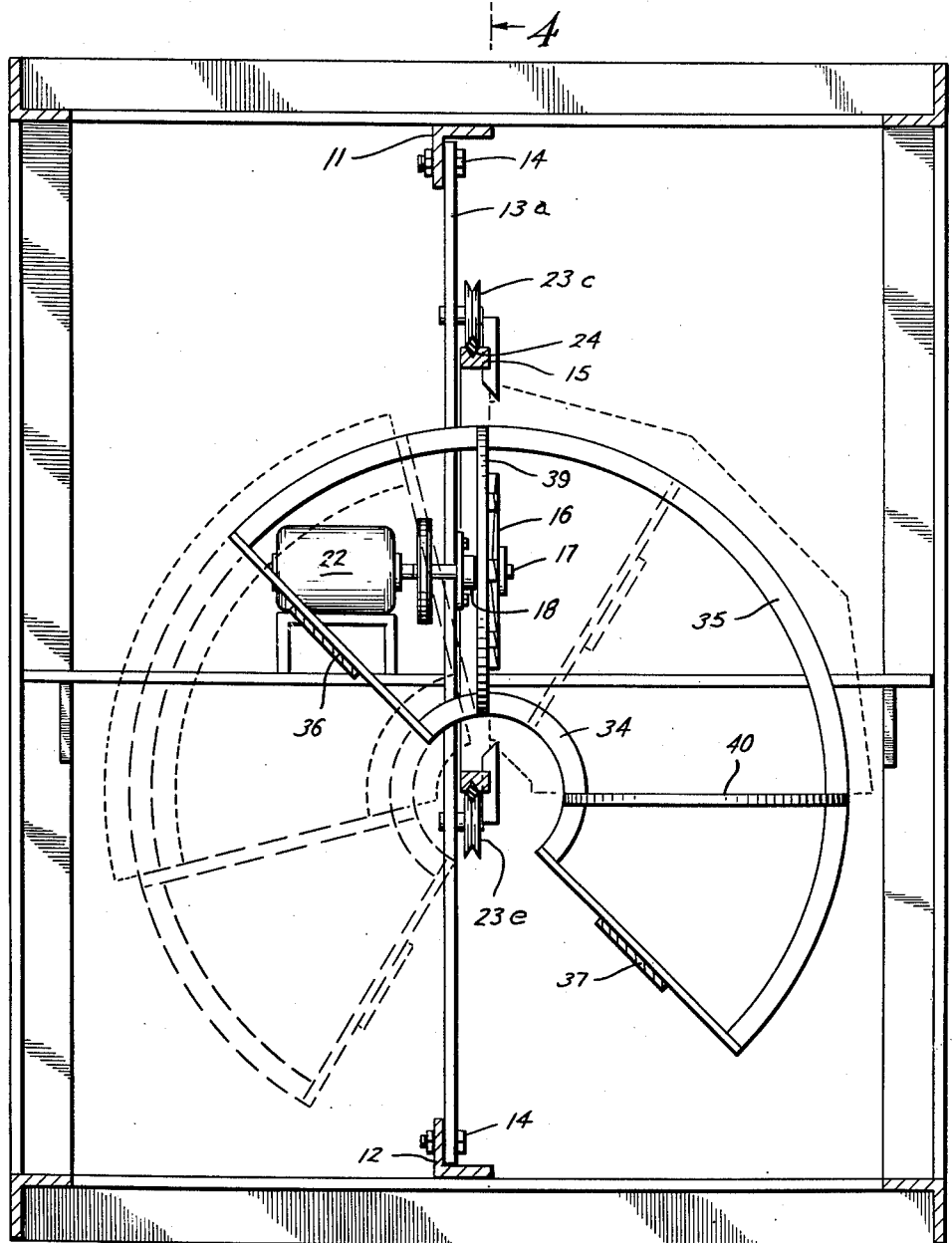
Figure 4:
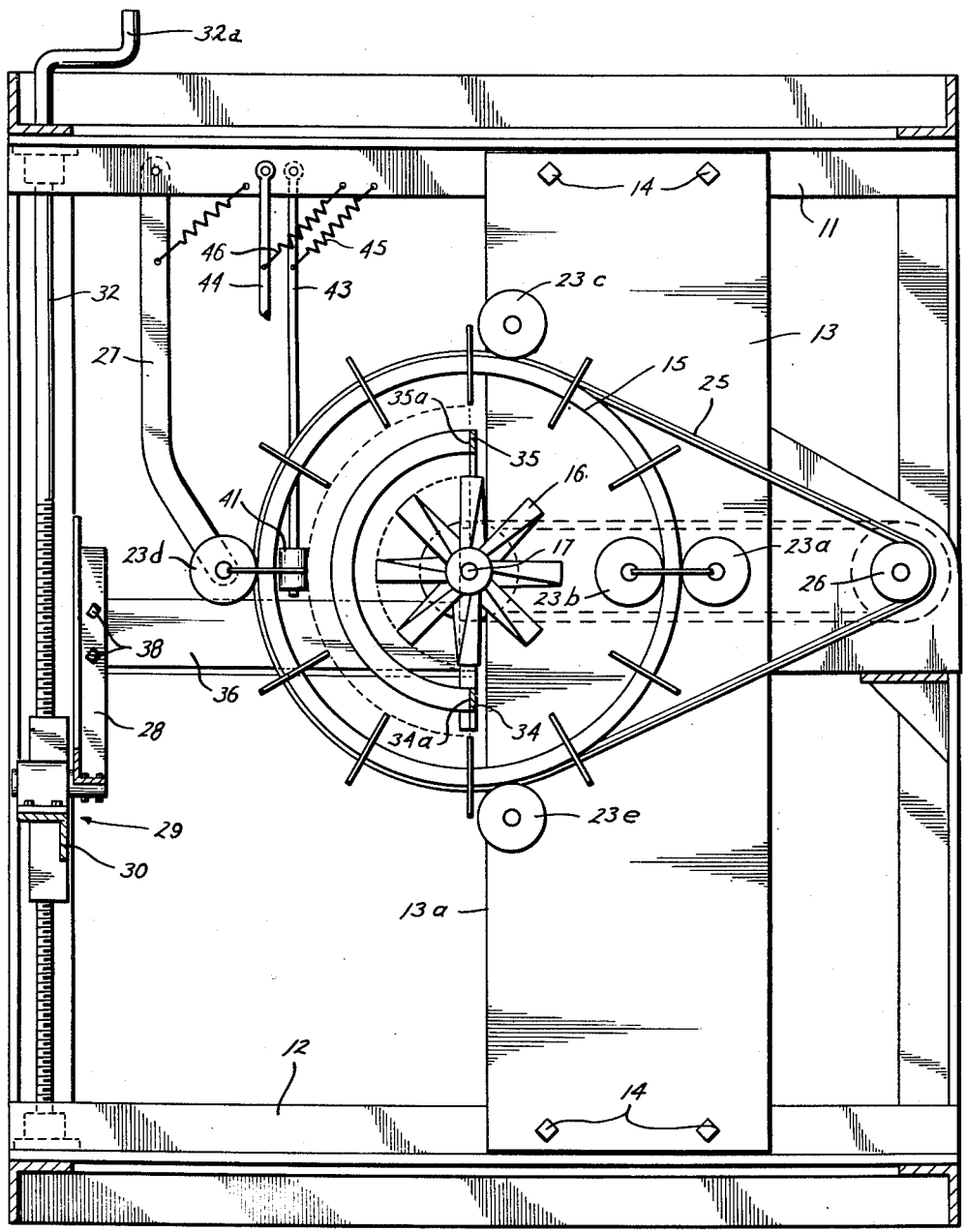

Fig. 3 is a view taken along the line 3—3 of Fig. 1, showing the work piece in dotted outline before and after it passes counterclockwise through the saws, and showing the supporting members for the work piece in dashed outline in the position they occupy after moving through the annular space between the saws; and Fig. 4 is a view along the line 4—4 of Fig. 3, showing the trailing edge of the finished member in dashed outline just leaving the saws.

The machine illustrated consists essentially of a pair of annular saws, one of which fashions the outer diameter of the product and will be referred to as the O. D. saw and the other of which fashions the inner diameter of the product and will be referred to as the I. D. saw, together with a work piece carrier for moving the work piece through the saws.

A framework indicated generally at 10 supports both the saws and the work piece carrier. The framework may be of any desired construction, such as the welded angle iron construction of the machine illustrated, and is provided with a pair of spaced angle irons 11 and 12 to which the saw support 13 may be quickly and easily attached by a plurality of bolts and nuts 14. This quick attachment feature permits the rapid substitution of one saw support for another carrying saws of different diameter to permit the fashioning of segments of insulating material of different diameters and different wall thicknesses.

A pair of annular saws 15 and 16 are mounted on the saw support for rotation about axes which are tangent to the same circle. The radius of this circle will be the radius of curvature of the central axis of the pipe about which the insulation is to be placed. This radius of curvature will also be the radius of curvature of the central axis of the member formed by the machine as the pipe and insulation members, when assembled about the pipe, are concentric. For simplicity of design, it is preferred that the two saws rotate about the same axis and in the same plane of rotation as shown in the machine illustrated. This will result in the simultaneous forming of the convex and concave surfaces of the segment of insulation as it passes through the saws insuring a proper wall thickness, with such wall thickness not being affected by the wear of guide parts or the like.

The I. D. saw 16 is essentially a milling cutter mounted on a shaft 17 which is journaled in a bearing 18 (Figs. 1 and 3). Bearing 18 is carried by support 13 and is spaced from the edge 13a of saw support 13 so that the axis of rotation of the saw is spaced from the saw support 13 (Fig. 4). This manner of mounting is desirable to permit the saw to fashion a fully semi-circular section of insulation as indicated in the drawing. A pulley 19 (best shown in Fig. 1) is fixed to the other end of shaft 17 and a drive belt 20 is received about this pulley and a pulley 21 carried by the prime mover 22.

The O. D. saw 15 is mounted for rotation about the same axis as I. D. saw 16 and for rotation in the same plane, that is, their cutting faces are in the same plane so that the cutting action of the two saws will be simultaneous by mounting the O. D. saw in a circular cluster of wheels 23a, 23b, 23c, 23d and 23e (Fig. 4). The outer periphery of O. D. saw 15 is provided with a V-groove 24. Wheels 23c, 23d and 23e are also each provided with a peripheral groove. A double V belt 25 is received in groove 24 of saw 15 and in the grooves of the rollers 23c, 23d and 23e. The belt extends about a pulley 26 carried by the prime mover to provide power for the O. D. saw. Saw 15 is held against movement along its rotational axis by belt 20 running in the grooved rollers 23c, 23d and 23e, and in groove 24 of saw 15. See Fig. 3. That is, any tendency for saw 15 to move along or tilt about its rotational axis will be transmitted through belt 20 to rollers 23c, 23d and 23e. Since these rollers are journalled for rotation in a fixed plane, the saw blade 15 will be maintained in its desired plane of rotation. The effect will be substantially the same as if the rollers ran in a groove in the outer periphery of the saw blade. Of course, the structure disclosed permits this function without the provision of an additional groove in the outer periphery of the saw blade. By reference to Fig. 4, it will be noted that wheel 23d is carried on a spring loaded arm 27, and wheels 23a, 23b, 23c and 23e are journaled in saw support 13. This manner of assembly permits the O. D. saw to be quickly and easily removed as a part of the assembly carried by saw support 13. For a more detailed explanation of the mounting of an annular saw such as illustrated herein, reference may be had to my application for "Tubular Power Saw," Serial No. 363,059, filed June 22, 1953, and issued June 26, 1956, as Patent No. 2,751,941; and the application of William M. Murfin for "Tubular Power Saw," Serial No. 257,032, filed November 19, 1951, and issued July 10, 1956, as Patent No. 2,753,899.

A work piece carrier is provided for positioning and moving a work piece through the annular saws 15 and 16 upon relative rotation of the work piece carrier and the saws about the circle to which the axis of rotation of saws 15 and 16 are tangent. In the machine illustrated the carrier comprises circular members which are pivoted for movement through the annular space between the saws 15 and 16 and carry means for supporting a work piece. The relative rotation is provided by mounting arm 28 of the work piece carrier on a pivot indicated generally at 29. Pivot 29 should provide for rotation of arm 28 in a plane which is spaced somewhat from the annular saws 15 and 16 so as to prevent interference between the arm and saws when the axis of pivot 29 lies within annular saw 15. Arm 28 should also rotate about an axis which is perpendicular to a plane which includes the axis of rotation of the two annular saws so that a work piece on the work piece carrier will be moved through the saws in a plane which does not intersect the axis of rotation of the saws. This axis of rotation should also be perpendicular to edge 13a of saw carrier 13 so that the work piece supporting means carried by arm 28 may move through the annular space between saws 15 and 16 without interference with saw support 13 when arm 28 is rotated about pivot 29. Pivot 29 should also be positioned in the plane of rotation of the two annular saws so that substantially concentric surfaces will be cut in the work piece by the annular saws 15 and 16. It will be understood that if pivot point 29 is moved to either side of the plane of rotation of the saw blades a more or less elliptical cut will be made by the annular saws and it is within the scope of this invention to so position pivot point 29 when an elliptical cut is desired.

Preferably, the machine is designed so that it will form segments of insulating material having any desired radius of curvature. For this purpose pivot 29 is mounted for movement toward and away from the saws to vary the radius of the circle in which the work piece is moved to pass through the saw blades. In the instant design, such movement is not directly toward and away from the axis of rotation of the saw blades but along a line in the plane of rotation of the blades and parallel to the edge 13a of the saw support 13. Thus, the effect of movement of the pivot 29 is to move the work supporting means toward and away from the axis of rotation of the saws 15 and 16 and in a diametral plane of the saws which is perpendicular to the axis of rotation of the pivot 29. Such movement may be provided by mounting pivot 29 on a cross head 30. The cross head 30 is carried by a guide rod 31 and a threaded rod 32. These rods are parallel to each other, to the plane of rotation of the saws, and to edge 13a of support 13. The cross head 30 is slidable on rod 31 and a nut 33 carried by cross head 30 cooperates with the threaded portion of rod 32 to raise or lower the cross head and thus the pivot upon rotation of rod 32 by a crank portion 32a (Fig. 4).

Arm 28 is provided with means which supports the work supporting means and cooperates therewith to position a work piece for rotation through the saw blades. Preferably, this means includes a pair of curved members 34 and 35 which are curved or dimensioned in such a manner as to move through the annular space between saws 15 and 16 upon rotation of arm 28 about pivot 29. Preferably, curved members 34 and 35 are arcs of a true circle and are mounted for concentric rotation about the axis of rotation of pivot 29. Curved members 34 and 35 are mounted for movement in a plane which is parallel to edge 13a of saw support 13 with the faces 34a and 35a of curved members 34 and 35, respectively, which are parallel to and furthest away from edge 13a of saw support 13 lying in a diametral plane of the saws. With this arrangement a block of material may be held snugly against faces 34a and 35a and the annular saws will form a semi-circular member. Curved members 34 and 35 are mounted upon arm 28 by means of extensions 36 and 37 (best shown in Fig. 1). Preferably, this mounting is a quick releasable one in the form of bolts 38 which may be quickly released to permit interchanging one set of curved members for another which are struck on different radii.

Work supporting means is carried by curved members 34 and 35 and is preferably in the form of converging abutment members such as members 39 and 40. These members are dimensioned for movement in the annular space between the two annular saws and preferably converge at 90° to provide a support for a work piece. These abutment members 39 and 40 are preferably arcuate semi-circular members mounted on the curved members and concentric with the annular saws when passing therethrough. The abutments should, of course, be struck on a radius such as to pass through the annular space between the two saws. In the machine illustrated the saws 15 and 16 are positioned above pivot point 29 and the work piece is moved by the carrier through the upper portion of a circle to fashion a curved member. With a machine so constructed, the supporting members 39 and 40 should converge toward the axis of rotation of pivot 29. Thus, the weight of the work piece will tend to wedge it tighter between the supporting abutments 39 and 40 as the work piece is moved between the saws.

Figure 2:
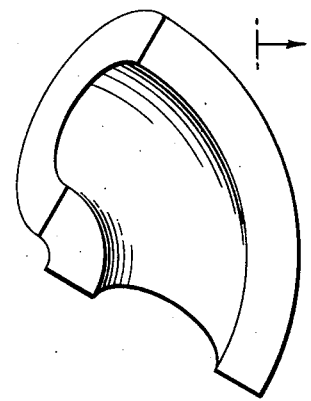
Fig. 2 is an isometric view of an insulating member formed by the machine of Fig. 1.

By reference to Fig. 2 of the drawings, it will be noted that the block of material to be sawed is pre-cut to have two surfaces at 90° to each other so as to readily fit between abutments 39 and 40. The block also has a face which will abut against surfaces 34a and 35a of the curved members. Thus, if the block of material is urged toward the center of rotation of the work piece carrier and toward surfaces 34a and 35a of curved members 34 and 35 while the work piece carrier is rotated to pass the work piece through the saws, a member such as shown in Fig. 2 will be fashioned.

To assist in holding the work piece in position, there is provided a pair of spring pressed rollers 41 and 42 which bear upon the work piece and urge it toward curved members 34 and 35. Rollers 41 and 42 are carried on rods 43 and 44, respectively, (Fig. 4) which are spring loaded by springs 45 and 46 to exert a pressure on the work piece in the desired direction. It will be noted that roller 42 bears upon the work piece before it enters the saw and roller 41 bears upon the finished member as it comes out of the saw.

Referring to Fig. 4, it will be noted that there is some clearance between the curved members 34 and 35 and the annular saws 15 and 16. This will permit slight movement of the curved members up and down as viewed in Fig. 4 to vary the radius of curvature of the member being fashioned. When it is desired to form a member having a radius of curvature which is greater or lesser than these tolerances will permit, the curved members and their supporting arms 36 and 37 may be quickly and easily removed from arm 28 by releasing bolts 38 and curved members formed on the proper radius substituted.

It will also be understood that in conjunction with the changing of the curved members of the work piece carrier to provide for rotation of a work piece about a greater or lesser radius of curvature, the saws may also be changed by substituting an assembly having either an I. D. or O. D. saw or both of greater or lesser diameter. In practice a substantial number of complete saw assemblies and of work piece carriers will be advantageous.

From the above it is believed clear that there has been provided a machine which will fashion a curved segment of insulating material or the like. The machine illustrated fashions a member semi-circular in cross section but it will be understood that a work piece having a lesser arc might be accommodated by mounting the curved members 34 and 35 to have abutment faces at the desired acute angle with each other. This would be of value in forming segments of less than 180° where three or more segments are necessary to encircle a large pipe and it is desired to cut the members from a small size blank.

Through the substitution of saw and work piece supporting assemblies insulation may be formed in any desired wall thickness, on any desired radius of curvature for any desired diameter pipe.

In some instances it is desirable to insulate a tube turn whose radius is so small relative to the desired thickness of material that arm 28 will rotate about an axis which lies inside the O. D. saw. When this occurs that portion of the O. D. saw which lies on the other side of the axis of rotation of the work piece carrier from the axis of rotation of the saws will not engage the work piece. For instance, in the machine illustrated in the drawings, the axis of pivot 29 would be raised until it is above the lower segment of the O. D. saw and this lower segment of the saw by reason of it being below the axis of pivot 29 will not engage the work piece as it is moved through the saws. When 90° tube turns are being insulated with segments so formed, the straight sections of insulation which abut the insulating about the tube turn should be beveled or otherwise cut away on the inside of the tube turn by the amount that the pivot point is inside of the O. D. saw to prevent their striking each other before they abut the insulation about the tube turn.

From the foregoing it will be seen that this invention is one well adapted to attain all of the ends and objects hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A machine for forming a longitudinally curved, concavo-convex member, comprising; a pair of annular saws of different diameters each mounted for rotation about an axis tangent to an arc of the same circle to cut concentric concavo-convex surfaces in a work piece upon relative movement of the saws and work piece about the center of said circle; a work piece carrier comprising a supporting arm, a member carried by the supporting arm and curved for movement through the annular space between the two annular saws upon relative movement of the arm and saws, and work supporting means carried by the curved member and dimensioned for movement through the annular space between the two annular saws upon relative movement of the arm and saws; and means mounting said saws and arm for relative movement about the center of said circle, whereby relative movement between the saws and arm will pass a work piece carried by the work supporting means through the saws and a longitudinally curved member with concentric concavo-convex surfaces will be formed from the work piece.

2. A machine for forming a longitudinally curved, concavo-convex member, comprising, a pair of annular saws of different diameters each mounted for rotation about an axis tangent to an arc of the same circle to cut concentric concavo-convex surfaces in a work piece moving circumferentially about the center of said circle, a work piece carrier comprising a supporting arm pivoted at the center of said circle, a member carried by the supporting arm and curved for movement through the annular space between the two annular saws upon rotation of the arm about its pivot, and a pair of abutment members carried by the curved member and dimensioned for movement through the annular space between the two annular saws, said abutment members converging toward said center to provide support for a work piece therebetween, whereby rotation of the arm about its pivot will pass a work piece positioned between the abutment members through the saws and a longitudinally curved member with concentric concavo-convex surfaces will be formed from the work piece.

3. The machine of claim 2 wherein there are two curved members which are spaced from each other, and the abutment members are circular segments which extend between the two curved members, said curved members and said abutment members providing support for a work piece.

4. A machine for forming a longitudinally curved, concavo-convex member, comprising, a pair of annular saws of different diameters mounted for rotation in the same plane and about the same axis to cut concentric concavo-convex surfaces in a work piece passed through the saws, a work piece carrier comprising a supporting arm carried on a pivot which lies in said plane, a member carried by the supporting arm and curved for movement through the annular space between the two annular saws upon rotation of the arm about its pivot, and work supporting means carried by the curved member and dimensioned for movement through the annular space between the two annular saws upon rotation of the supporting arm, whereby rotation of the arm about its pivot will pass a work piece carried by the work supporting means through the saws and a longitudinally curved member with concentric concavo-convex surfaces will be formed from the work piece.

5. A machine for forming a longitudinally curved, concavo-convex member, comprising, a pair of annular saws of different diameters mounted for rotation in the same plane and about the same axis to cut concentric concavo-convex surfaces in a work piece passed through the saws, a work piece carrier comprising a supporting arm carried on a pivot which lies in said plane, a member carried by the supporting arm curved for movement through the annular space between the two annular saws upon rotation of the arm about its pivot, and a pair of abutment members carried by the curved member and dimensioned for movement through the annular space between the two annular saws, said abutment members converging toward the pivot to provide support for a work piece wedged therebetween, whereby rotation of the arm about its pivot will pass a work piece positioned between the abutment members through the saws and a longitudinally curved member with concentric concavo-convex surfaces will be formed from the work piece.

6. A machine for forming a longitudinally curved, concavo-convex member, comprising, a pair of annular saws of different diameters mounted for rotation in the same plane and about the same axis to cut concentric concavo-convex surfaces in a work piece passed through the saws, a work piece carrier comprising a supporting arm carried on a pivot which lies in said plane and is movable toward and away from the saws to vary the radius of curvature of the member being formed, a member carried by the supporting arm and curved for movement through the annular space between the two annular saws upon rotation of the arm about its pivot, and a pair of abutment members carried by the curved member and dimensioned for movement through the annular space between the two annular saws, said abutment members converging toward the pivot to provide support for a work piece wedged therebetween, whereby rotation of the arm about its pivot will pass a work piece positioned between the abutment members through the saws and a longitudinally curved member with concentric concavo-convex surfaces will be formed from the work piece.

7. A machine for forming a longitudinally curved, concavo-convex member, comprising, a pair of annular saws of different diameters mounted for rotation in the same plane and about the same axis to cut concentric concavo-convex surfaces in a work piece passed through the saws, a work piece carrier comprising a supporting arm carried on a pivot which lies in said plane, a pair of members carried by the supporting arm and curved for movement through the annular space between the two annular saws upon rotation of the arm about its pivot, said curved members lying in a plane perpendicular to the rotational axis of the supporting arm and movable through the annular space between saws on opposite sides of the small diameter saw, and a pair of abutment members converging toward the pivot and extending between the two curved members and dimensioned for movement between the annular saws, said abutment members and curved members providing support for a work piece wedged between the abutment members, whereby rotation of the arm about its pivot will pass a work piece positioned between the abutment members through the saws and a longitudinally curved member with concentric concavo-convex surfaces will be formed from the work piece.

8. The machine of claim 7 wherein the abutment members are semi-circular in form and perpendicular to the curved members with one end of each abutment member secured to one of the curved members whereby when the abutment members are moved through the annulus between the saws they underlie the outer diameter saw and overlie the inner diameter saw.

9. The machine of claim 7 wherein the pivot is movable toward and away from the saws to vary the radius of curvature of the member being formed.

10. A power saw comprising, a frame, an annular saw blade, a groove in the outer periphery of the saw blade, a drive belt running in said groove for rotating said saw blade, said belt being of greater cross-sectional depth than the depth of said groove so as to project from the outer periphery of the saw blade, a cluster of rollers spaced about said saw blade and journaled in said frame for rotation in the plane of rotation of the saw blade, a portion of said rollers having grooves in their outer periphery in engagement with sections of said drive belt at positions where said sections are in engagement with the saw blade, whereby said drive belt runs between and in engagement with the saw blade and a roller at several spaced points about the saw blade and coacts therewith to maintain the saw blade in the desired plane of rotation.

11. A machine for forming a longitudinally curved concavo-convex member comprising; a saw assembly and a work piece carrier mounted for relative movement about a center to pass a work piece through the saws; said saw assembly comprising a pair of annular saws of different diameter each mounted for rotation about its central axis; said work piece carrier comprising a support arm pivoted on said center, work support means having work piece engaging surfaces for engaging the front and rear faces of a work piece and supporting the work piece as it passes through the saws and supporting a finished concavo-convex member after it has been cut from a work piece, said support means dimensioned for movement about the smaller of said saws and within the bore through the larger of said saws, and means for mounting the work support means on the arm in a position to pass the work piece engaging surfaces and the work piece carried thereby completely through the saws upon relative rotation of the saw assembly and work piece carrier about said center, said last mentioned means having a portion curved to pass within the bore through the larger saw and without the smaller saw.

12. A machine for forming a longitudinally curved concavo-convex member comprising; a pair of annular saws of different diameter each mounted for rotation about its central axis; and a work piece carrier comprising, a pivot, a support arm mounted for rotation about said pivot, work support means having work piece engaging surfaces for engaging the front and rear faces of a work piece and supporting the work piece as it passes through the saws and supporting a finished concavo-convex member after it has been cut from a work piece, said support means dimensioned for movement about the smaller of said saws and within the bore through the larger of said saws; and means for mounting the work support means on the arm in a position to pass the work piece engaging surfaces and the work piece carried thereby completely through the saws upon rotation of the support arm about its pivot, said last mentioned means having a portion curved to pass within the bore through the larger saw and without the smaller saw.

13. A machine for forming a longitudinally curved concavo-convex member comprising; a pair of annular saws of different diameter, each mounted for rotation about its central axis; and a work piece carrier comprising, a pivot, a support arm mounted for rotation about such pivot, work support means having work piece engaging surfaces including surfaces confronting each other and converging toward the pivot upon which the arm is mounted and at least one surface extending perpendicular to the confronting surfaces for engaging and supporting a work piece, said support means dimensioned for movement about the smaller of said saws and within the bore through the larger of said saws; and means for mounting the work support means on the arm in a position to pass the work piece engaging surfaces and the work piece carried thereby through the saws upon rotation of the support arm about its pivot.

References Cited in the file of this patent

UNITED STATES PATENTS

| Number | Name | Date |
| --- | --- | --- |
| 5,306 | Hutchins | Sept. 25, 1847 |
| 22,792 | Field | Feb. 1, 1859 |
| 25,014 | Hay | Aug. 9, 1859 |
| 128,243 | Osten | June 25, 1872 |
| 190,452 | Stevens | May 8, 1877 |
| 565,633 | Pessenger | Aug. 11, 1896 |